United States Patent Office 3,170,535
Patented Feb. 23, 1965

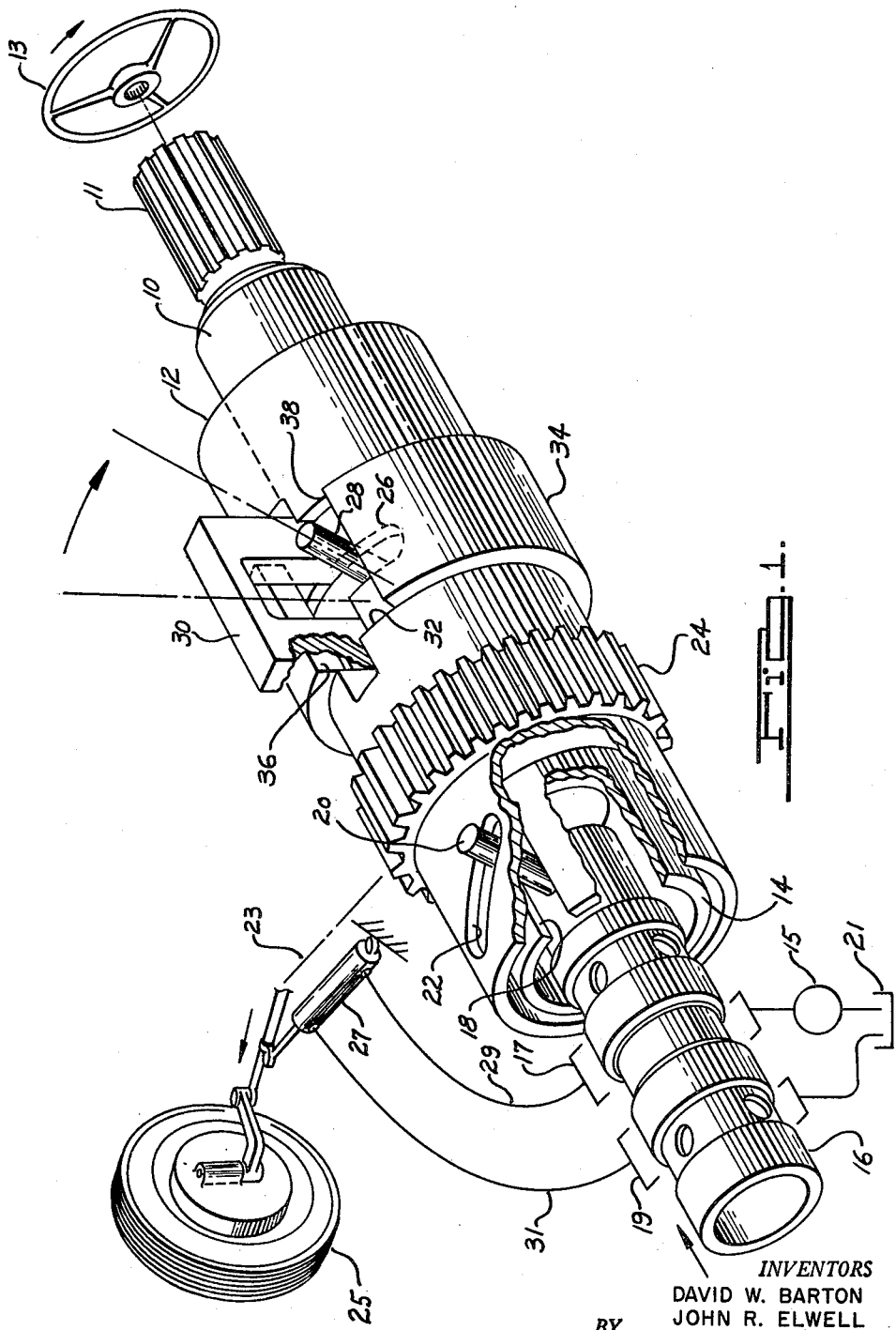

3,170,535
POWER STEERING MECHANISM
David W. Barton, Birmingham, and John R. Elwell, Dearborn, Mich., assignors to Ford Motor Company, Dearborn, Mich., a corporation of Delaware
Continuation of application Ser. No. 824,814, July 3, 1959. This application Feb. 23, 1962, Ser. No. 176,488
9 Claims. (Cl. 180—79.2)

This invention relates generally to power steering mechanisms for motor vehicles, and more particularly to an improved servo valve for use in such a system.

This application is a continuation of co-pending application S.N. 824,814, filed July 3, 1959, for a Power Steering Mechanism, now abandoned.

Servo valves for use in power steering systems normally include a pair of relatively moveable valve elements shiftable to control application of power, and resilient means for centering the valve elements when no steering effort is being applied. It is important that the valve elements be accurately centered and their relative movement be uniformly opposed. The resilient centering means utilized by the prior art have often been complex and susceptible to breakage and misadjustment in service. Further, many of the centering devices in such valves utilize separate resilient elements to resist movement in opposite directions. Thus, any variation in the separate resilient means are manifested in an undesirable difference in "feel" when steering in different directions.

It is, therefore, an object of this invention to provide an improved, rugged, and precise servo valve for a motor vehicle power steering gear.

Another object is to provide a servo valve which gives identical feel in both directions of operation.

An additional object is to provide such a servo valve which employs simple, low-cost parts.

Further objects and advantages of the present invention will be apparent from the following description, reference being had to the accompanying drawing wherein a preferred form of the present invention is clearly shown.

In the drawing:

The single figure is a perspective view, partly in section, of a servo valve employing the present invention.

The preferred form of the invention illustrated includes an input shaft 10 which has a spline 11 for connection to the steering wheel 13 of a motor vehicle. On shaft 10 an output shaft 12 is journalled for rotation relative thereto. The input shaft 10 extends through the hollow output shaft 12 and has an enlarged cylindrical end 14 which concentrically receives one end of a valve spool 16. Spool 16 is a conventional 4-way valve spool which will be slidably received in a valve bore of a conventional valve body, not shown, to regulate interconnection between a pair of motor ports 17 and 19 and a pump 15 and a reservoir 21. The enlarged cylindrical end 14 of input shaft 10 includes a longitudinal slot 18 through which a pin 20 fixed to valve spool 16 extends into a helical slot 22 in the output shaft 12.

A spur gear 24 encircles the periphery of output shaft 12 and is fixed thereto. Gear 24 will engage a rack or other toothed member, schematically indicated at 23, which connects through the usual steering linkage with a dirigible wheel 25 of the vehicle. A fluid motor 27 is also connected to wheel 25 and controlled by fluid directed by valve spool 16 through flexible conduits 29 and 31.

Output shaft 12 also includes a slot 26 of limited arcuate extent through which extends a pin 28 which is fixed to the input shaft 10. Fixedly mounted on the output shaft 12 is a saddle-like abutment 30 which has the same thickness as the pin 28, measured in the chordal direction. Angular location of abutment 30 is such that it is centered relative to the arcuately extending slot 26. It will be noted that relative rotation of shafts 10 and 12 will be limited by engagement of pin 28 with the ends of slot 26.

The periphery of output shaft 12 is grooved at 32 to provide a seat for a generally cylindrical, axially-split band spring 34. The band spring 34 is so proportioned that in the unstressed condition its opposed end faces 36 and 38 have a chordal separation which is less than the chordal thickness of abutment 30. Further, when the band spring 34 is mounted on the output shaft 12 and its end faces 36 and 38 are in contact with the abutment 30, the inside diameter of the band spring is slightly greater than the diameter of the groove 32, thus providing a centering preload, but smaller than the outside diameter of shaft 12, so as to be restrained against longitudinal movements by the sides of the groove 32.

It will be seen that when no torque is being applied to input shaft 10, the band spring 34 will angularly center the shafts 10 and 12 by urging the pin 28 into angular alignment with the anchor 30. Since the chordal thicknesses of pin 28 and anchor 30 are the same, the two shafts will have an accurately located centered position to which they are continually biased by the band spring 34. It should also be noted that since the band spring 34 in the unstressed condition is so proportioned as to position the faces 36 and 38 closer together than the thickness of abutment 30, the shafts 10 and 12 are preloaded to the centered position.

In operation, when a torque is applied to the input shaft 10, and the resistance to turning encountered by the output shaft 12 exceeds the preload of band spring 34, the band spring 34 will expand, and the resulting relative rotation between shafts 10 and 12 actuates the valve spool 16 in a longtudinal direction due to the co-action of axial slot 18 and helical slot 22 on the pin 20. It will be noted that regardless of the direction of the rotation of shaft 10 the resistance to rotation relative to shaft 12 will be the same, since identical distortion of the single resilient means 34 will result.

It will be seen from the foregoing that there has been provided a simple, rugged, and low-cost servo valve for use in a power steering mechanism, in which the initial, perceptible resistance to actuation will be identical regardless of the direction of the operation.

While the form of embodiment of the invention as herein disclosed constitutes a preferred form, it is to be understood that other forms might be adopted, all coming within the scope of the claims which follow.

What is claimed is as follows:

1. A control means for controlling the power means of a power steering mechanism comprising: a driving means; a sensing means having concentric telescopically related input and output shafts, said input shaft adapted to be driven by said driving means, a generally cylindrical, axially-split band spring encircling the outer of said shafts so as to contract thereon, and presenting opposed ends in spaced relationship, a radially extending arm fixed to the inner of said shafts and extending through an opening in the outer of said shafts located so as to be interposed between said opposed ends of said spring, an abutment member carried by the outer of said shafts longitudinally located with respect to said shafts so as to be interposed between said opposed ends of said spring, and having substantially the same chordal thickness as said arm, said input shaft adapted to be rotated relative to said output shaft against the force of said axially-split band spring when the torque applied to said driving means exceeds a selected value, a movable valve element and actuating means movable in response to relative rotation of said shafts of said sensing means and adapted to move the movable valve element, whereby the relative rotation of said input and output shafts causes said valve actuating means to actuate said movable valve element to control the power means of a power steering mechanism.

2. The structure defined by claim 1 wherein said split band spring is so proportioned that in the unstressed condition the chordal distance between said opposed ends is less than the chordal thickness of said abutment member.

3. The structure defined by claim 1 wherein said opening in the outer of said shafts is of limited arcuate extent so as to limit relative rotation of said shafts.

4. The structure defined by claim 1 wherein said valve actuating means comprises a radial slot in one of said shafts, a helical slot in the other of said shafts, and a radially extending valve actuating member engaging both of said slots.

5. A power steering system for a vehicle comprising: an input shaft, a steering wheel connected to said input shaft, an output shaft, a steerable road wheel, linkage means coupling said steerable road wheel with said output shaft, a fluid motor connected to said steerable road wheel through said linkage means, a source of fluid under pressure, valve means for controlling the actuation of said fluid motor, said valve means being positioned between said source of fluid under pressure and said fluid motor, cooperating means on said input and output shaft and on said valve means for actuating said valve means upon relative rotation of said input shaft and said output shaft, a unitary resilient member in the form of a C-spring interconnecting said output shaft and said input shaft, said C-spring preventing relative rotation between said input shaft and said output shaft when the torque applied to said input shaft through said steering wheel is below a selected level and expanding to permit relative rotation between said input shaft and said output shaft when the torque applied to said input shaft by said steering wheel exceeds said selected level, whereby said valve means is actuated and fluid under pressure is supplied to said fluid motor when the torque applied to said input shaft through said steering wheel exceeds said selected level.

6. A power steering system for a vehicle comprising: a steering means, a steerable element which resists being moved, said steering means operatively coupled to said steerable element, a power moving means connected to said steerable element, said power moving means only being actuated when the force exerted by said steering means is above a given value, a control means for sensing when the force exerted by said steering means is above said given value and for actuating the power moving means when said given value is sensed, said control means connected to said steering means and said power moving means, said control means including a sensing means having a unitary resilient member having a gap which is expanded when said force exerted by said steering means is above said given value, the expanding of said gap of said resilient member causing a signal whereby the control means actuates the power moving means.

7. The structure defined by claim 6 wherein said sensing means comprises: a first shaft operatively coupled to said steerable element and having an abutment means contacting said unitary resilient member, a second shaft operatively coupled to said steering means and having an abutment means contacting said unitary resilient member, said abutment means on said second shaft tending to exert a force to expand the gap of said unitary resilient member and said abutment means on said first shaft tending to hold said unitary resilient means to resist said force when the force exerted by said steering means is above said given value.

8. The structure defined by claim 6 wherein said sensing means comprises: concentric, telescopically related input and output shafts, one of said shafts being an inner shaft and one of said shafts being an outer shaft, said outer shaft being connected to said steerable means, said resilient member being a cylindrical axially-split band spring encircling said outer shaft so as to contract thereon and presenting opposed ends in spaced relationship; a radially extending arm fixed to said inner shaft and extending through an opening in said outer shaft, located so as to be interposed between the ends of said spring, an abutment member carried by said outer shaft, said abutment member located with respect to said shafts so as to be interposed between said opposed ends of said spring, said inner shaft adapted to rotate relative to said outer shaft when the force exerted by said steering means is above said given value; and valve actuating means movable in response to the relative rotation of said shafts and adapted to actuate said power moving means so that said power moving means will move said steerable element.

9. A power steering system for a vehicle comprising: a steering means, a steerable element which resists being moved, a power moving means connected to said steerable element, said power moving means only being actuated when the force exerted by said steering means is above a selected level, a control means for sensing when the force exerted by said steering means is above said selected level and for actuating said power moving means when said selected level is sensed, said control means comprising: concentric, telescopically related input and output shafts, one of said shafts being an inner shaft and one of said shafts being an outer shaft, said outer shaft being connected to said steerable means, said inner shaft connected to said steering means, said inner shaft connected to said outer shaft to rotate relative to said outer shaft when the force exerted by said steering means is above said selected level, said connection comprising: a cylindrical axially-split band spring, said band spring encircling said outer shaft so as to contract thereon and presenting opposed ends in spaced relationship, a radially extending arm fixed to said inner shaft and extending through an opening in said outer shaft, located so as to be interposed between said opposed ends of said spring, an abutment member carried by said outer shaft, longitudinally located with respect to said shaft so as to be interposed between said opposed ends of said springs, said abutment member and said radial arm cooperating to compress said axially-split band spring when the force exerted by said steering means is above said selected level, thereby enabling said inner and outer shafts to rotate relative to each other, and valve means movable in response to the relative motion of said shafts and adapted to actuate said power moving means so that said power moving means will move said steerable element.

References Cited in the file of this patent
UNITED STATES PATENTS

| | | |
|---|---|---|
| 2,484,321 | Stubau | Oct. 11, 1949 |
| 2,826,258 | Livers | Mar. 11, 1958 |
| 2,918,135 | Wittren | Dec. 22, 1959 |